US 9,148,333 B2

(12) United States Patent
Bustamente

(10) Patent No.: US 9,148,333 B2
(45) Date of Patent: *Sep. 29, 2015

(54) SYSTEM AND METHOD FOR PROVIDING ANONYMITY IN A SESSION INITIATED PROTOCOL NETWORK

(75) Inventor: Michael G. Bustamente, Frisco, TX (US)

(73) Assignee: MATCH.COM, L.L.C., Dallas, TX (US)

( * ) Notice: Subject to any disclaimer, the term of this patent is extended or adjusted under 35 U.S.C. 154(b) by 410 days.

This patent is subject to a terminal disclaimer.

(21) Appl. No.: 12/415,839

(22) Filed: Mar. 31, 2009

(65) Prior Publication Data

US 2010/0246576 A1  Sep. 30, 2010

(51) Int. Cl.
*H04L 12/28* (2006.01)
*H04L 29/12* (2006.01)
*H04L 29/06* (2006.01)
*H04J 1/16* (2006.01)

(52) U.S. Cl.
CPC ........ *H04L 29/12594* (2013.01); *H04L 61/301* (2013.01); *H04L 61/3085* (2013.01); *H04L 63/0421* (2013.01); *H04L 65/1069* (2013.01)

(58) Field of Classification Search
USPC .......................... 370/282, 352, 386, 389, 401
See application file for complete search history.

(56) References Cited

U.S. PATENT DOCUMENTS

| | | | |
|---|---|---|---|
| 6,175,619 B1 | 1/2001 | DeSimone | |
| 6,408,001 B1 | 6/2002 | Chuah et al. | |
| 6,564,261 B1 | 5/2003 | Gudjonsson et al. | |
| 6,680,943 B1 | 1/2004 | Gibson et al. | |
| 6,865,161 B1 | 3/2005 | Sponaugle et al. | |
| 7,139,811 B2 | 11/2006 | Lev Ran et al. | |
| 7,151,749 B2 | 12/2006 | Vega-Garcia et al. | |
| 7,171,482 B2 | 1/2007 | Jones et al. | |
| 7,203,674 B2 * | 4/2007 | Cohen | 709/206 |
| 7,394,811 B2 | 7/2008 | Gibson et al. | |
| 7,440,562 B2 | 10/2008 | Barnes et al. | |
| 7,478,161 B2 | 1/2009 | Bernet et al. | |
| 7,486,696 B2 | 2/2009 | Garg et al. | |
| 7,499,720 B2 | 3/2009 | Idnani | |
| 7,539,127 B1 | 5/2009 | Shaffer et al. | |
| 7,630,486 B2 | 12/2009 | Lee et al. | |
| 7,640,293 B2 | 12/2009 | Wilson et al. | |
| 7,649,881 B2 | 1/2010 | Casey | |
| 7,792,065 B2 | 9/2010 | Jepson et al. | |
| 8,051,130 B2 | 11/2011 | Logan et al. | |
| 8,054,960 B1 | 11/2011 | Gunasekara | |
| 8,281,027 B2 | 10/2012 | Martinez et al. | |
| 8,316,134 B2 | 11/2012 | Tanimoto | |

(Continued)

OTHER PUBLICATIONS

Rosenberg et al., "SIP: Session Initiation Protocol", Network Working Group Request for Comments: 3261, Jun. 2002.*

(Continued)

*Primary Examiner* — John Pezzlo
(74) *Attorney, Agent, or Firm* — Patent Capital Group

(57) ABSTRACT

A method for facilitating an anonymous communications session in a communications environment is provided that includes receiving, from a first endpoint, a request for a communication session involving a second endpoint. The method also includes identifying end user data associated with a first endpoint. The data associated with the first endpoint is mapped to an identity of the first endpoint. The second endpoint is shown the identity of the first endpoint and not the end user data associated with the first endpoint.

27 Claims, 3 Drawing Sheets

(56) References Cited

U.S. PATENT DOCUMENTS

| | | | |
|---|---|---|---|
| 8,621,090 | B2 | 12/2013 | Bustamente |
| 8,885,012 | B2 | 11/2014 | Bustamente |
| 8,996,618 | B2 | 3/2015 | Bustamente |
| 2002/0041590 | A1* | 4/2002 | Donovan ................. 370/352 |
| 2003/0224792 | A1 | 12/2003 | Verma et al. |
| 2003/0235209 | A1 | 12/2003 | Garg et al. |
| 2004/0030747 | A1 | 2/2004 | Oppermann |
| 2005/0246419 | A1* | 11/2005 | Jaatinen ................. 709/204 |
| 2005/0276268 | A1* | 12/2005 | Poikselka et al. ......... 370/395.2 |
| 2006/0045243 | A1 | 3/2006 | Durga et al. |
| 2006/0146997 | A1 | 7/2006 | Qian et al. |
| 2006/0235994 | A1 | 10/2006 | Wu |
| 2006/0281407 | A1 | 12/2006 | Deeds et al. |
| 2007/0019545 | A1 | 1/2007 | Alt et al. |
| 2007/0064895 | A1 | 3/2007 | Wong et al. |
| 2007/0071223 | A1 | 3/2007 | Lee et al. |
| 2007/0201480 | A1 | 8/2007 | Bao et al. |
| 2007/0282621 | A1* | 12/2007 | Altman et al. ................. 705/1 |
| 2008/0070697 | A1 | 3/2008 | Robinson et al. |
| 2008/0104227 | A1 | 5/2008 | Birnie et al. |
| 2008/0144615 | A1 | 6/2008 | Casey |
| 2008/0255989 | A1 | 10/2008 | Altberg et al. |
| 2009/0024741 | A1 | 1/2009 | Roach |
| 2009/0322597 | A1 | 12/2009 | Medina-Herrero et al. |
| 2010/0071053 | A1 | 3/2010 | Ansari et al. |
| 2010/0077017 | A1 | 3/2010 | Martinez et al. |
| 2010/0083364 | A1 | 4/2010 | Fernandez Gutierrez |
| 2010/0088246 | A1 | 4/2010 | Lim |
| 2010/0099389 | A1 | 4/2010 | Zhu et al. |
| 2010/0106842 | A1 | 4/2010 | Cosmadopoulos et al. |
| 2010/0195488 | A1 | 8/2010 | Mehrotra et al. |
| 2010/0217837 | A1 | 8/2010 | Ansari et al. |
| 2010/0217876 | A1 | 8/2010 | Fikouras et al. |
| 2010/0241755 | A1 | 9/2010 | Bassett et al. |
| 2010/0260174 | A1 | 10/2010 | Preiss et al. |
| 2010/0283827 | A1 | 11/2010 | Bustamente |
| 2010/0285856 | A1 | 11/2010 | Thomas |
| 2010/0287286 | A1 | 11/2010 | Bustamente |
| 2011/0182205 | A1 | 7/2011 | Gerdes et al. |
| 2011/0289574 | A1* | 11/2011 | Hull et al. ................. 726/7 |
| 2011/0313647 | A1 | 12/2011 | Koebler |
| 2013/0003718 | A9 | 1/2013 | daCosta et al. |
| 2013/0212494 | A1* | 8/2013 | Heiferman et al. ............ 715/753 |
| 2013/0232213 | A1 | 9/2013 | Bustamente |
| 2013/0238708 | A1 | 9/2013 | Bustamente |
| 2014/0082087 | A1 | 3/2014 | Bustamente |

OTHER PUBLICATIONS

Non-Final Office Action in U.S. Appl. No. 12/436,912 mailed on Apr. 28, 2011.

Response to Non-Final Office Action dated Apr. 28, 2011 in U.S. Appl. No. 12/436,912, filed Jul. 28, 2011.

Final Office Action in U.S. Appl. No. 12/436,912 mailed on Oct. 11, 2011.

Request for Continued Examination and Amendment in U.S. Appl. No. 12/436,912, filed Dec. 8, 2011.

Examiner Interview Summary in U.S. Appl. No. 12/436,912 mailed on Dec. 14, 2011.

Offringa, Peter "Zoosk—The Engineering behind Real Time Communications," available online at <URL http://highscalability.com/blog/2012/8/27/zoosk-the-engineering-behind-real-time-communications.html>, Aug. 27, 2012 (4 pages).

Zoosk Customer Support, "How Do I Video Chat?" available online at <URL https://zoosk.zendesk.com/entries/20513017-how-do-i-video-chat> Oct. 7, 2011 (3 pages).

Fiore, Andrew, et al., "Online Personals: An Overview," CHI 2004, Apr. 24-12, 2004, Vienna, Austria (pp. 1395-1398).

Non-Final Office Action in U.S. Appl. No. 12/436,869 mailed on Feb. 7, 2012.

Response to Non-Final Office Action dated Feb. 7, 2012 in U.S. Appl. No. 12/436,869, filed Apr. 25, 2012.

Final Office Action in U.S. Appl. No. 12/436,869 mailed on May 30, 2012.

Request for Continued Examination and Amendment in U.S. Appl. No. 12/436,869, filed Jul. 25, 2012.

Non-Final Office Action in U.S. Appl. No. 12/436,912 mailed on Nov. 27, 2012.

Response to Non-Final Office Action dated Nov. 27, 2012 in U.S. Appl. No. 12/436,912, filed Feb. 27, 2013.

Notice of Allowance in U.S. Appl. No. 12/436,912 mailed on Jul. 18, 2013.

U.S. Appl. No. 13/869,912, filed Apr. 24, 2013 and entitled "System and Method for Providing Calendar and Speed Dating Features for Matching Users in a Network Environment", Inventor Michael G. Bustamente.

U.S. Appl. No. 13/869,948, filed Apr. 24, 2013 and entitled "System and Method for Providing Calendar and Speed Dating Features for Matching Users in a Network Environment", Inventor Michael G. Bustamente.

Notice of Allowance in U.S. Appl. No. 12/436,869 mailed on Jul. 9, 2014.

Notice of Allowance in U.S. Appl. No. 14/088,387 mailed on Dec. 18, 2014.

Non-Final Office Action in U.S. Appl. No. 13/869,912 mailed on Feb. 27, 2015.

Non-Final Office Action in U.S. Appl. No. 14/088,387 mailed on Sep. 22, 2014.

Response to Non-Final Office Action dated Sep. 22, 2014 in U.S. Appl. No. 14/088,387, filed Nov. 20, 2014.

Response to Non-Final Office Action dated Feb. 27, 2015 in U.S. Appl. No. 13/869,912 filed on May 27, 2015.

Notice of Allowance in U.S. Appl. No. 13/869,948 mailed on May 19, 2015.

* cited by examiner

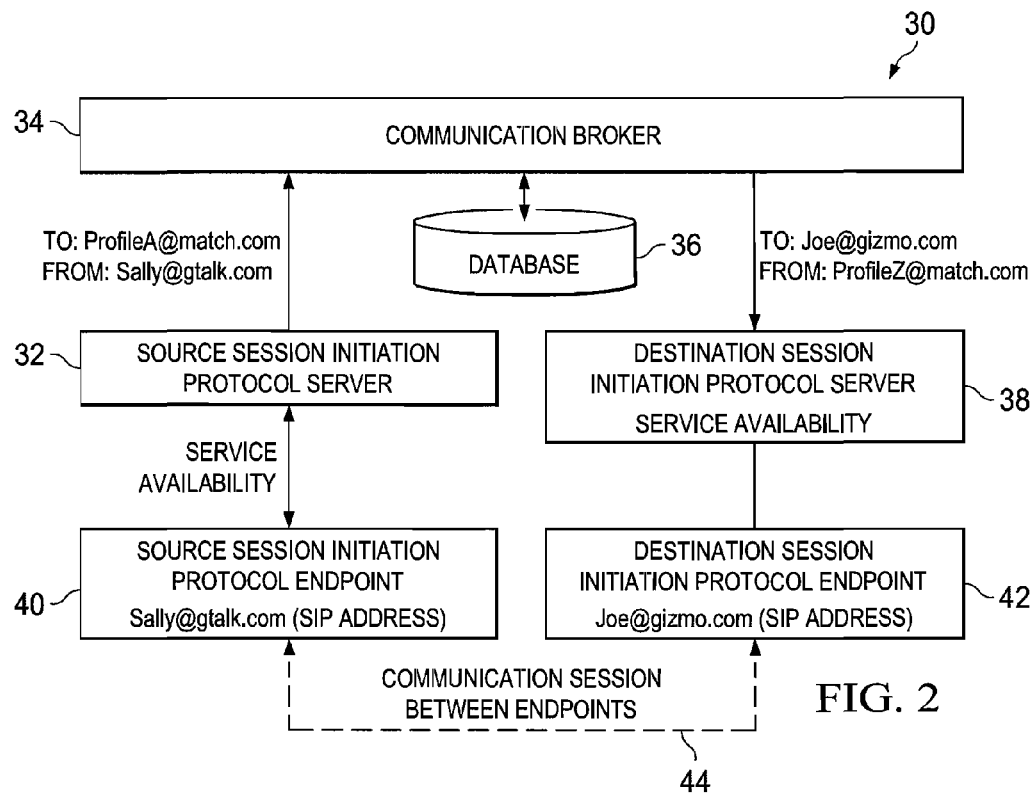
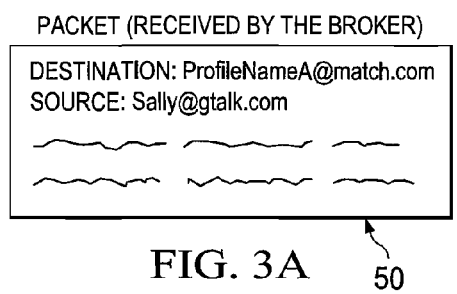
FIG. 3A
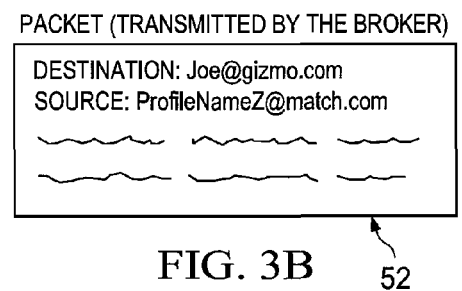
FIG. 3B

SYSTEM AND METHOD FOR PROVIDING ANONYMITY IN A SESSION INITIATED PROTOCOL NETWORK

TECHNICAL FIELD OF THE INVENTION

This invention relates in general to the field of communications and, more particularly, to a system and a method for user anonymity in a session initiated protocol network environment.

BACKGROUND OF THE INVENTION

Electronic architectures have experienced significant notoriety because they can offer the benefits of automation, convenience, and data management for their respective online communities. Certain network protocols may be used in order to allow an end user to be matched to other end users or to scenarios in which they stand to benefit (e.g., job searches, person-finding services, real estate searches, online dating, etc.).

In some cases, end users desire that their identity, address, or other personal information remain anonymous. The ability to initiate a communication session between two users without exchanging personal information offers a significant challenge to network operators, administrators, and device manufacturers.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which:

FIG. 2 is a diagram illustrating a network for providing anonymous SIP communications in accordance with one embodiment of the invention disclosed herein;

FIGS. 3A and 3B are block diagrams illustrating a packet network address translation context in accordance with one embodiment of the invention disclosed herein.

DETAILED DESCRIPTION OF EXAMPLE EMBODIMENTS

Figure 1:
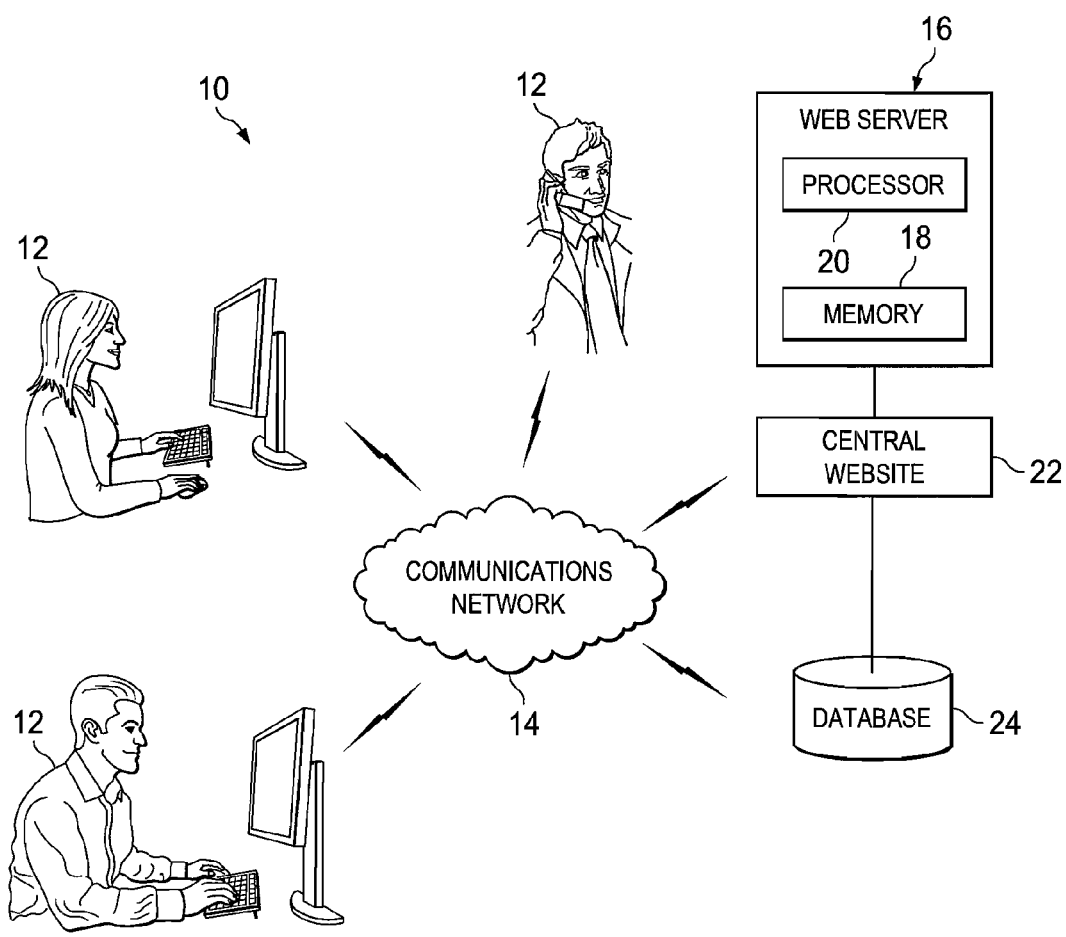
FIG. 1 is a network diagram showing an operating environment of the present invention in accordance with one embodiment of the present invention.

FIG. 1 is a simplified block diagram of a communication system 10 for communicating, receiving, and transmitting data in a communications environment (e.g., a SIP environment). Communication system 10 includes endpoints 12, a communications network 14, a web server 16 including memory 18 and processor 20, a central website 22, and database 24.

Endpoints 12 are clients or customers wishing to initiate a communication in communication system 10 via some network. In one example implementation, endpoints 12 are personal computers that are operable to interface with a SIP network. Note also that the term 'endpoint' may be inclusive of devices used to initiate a communication, such as a computer, a personal digital assistant (PDA), a laptop or electronic notebook, a cellular telephone, an IP telephone, an I-Phone, or any other device, component, element, or object capable of initiating voice, audio, or data exchanges within communication system 10. Endpoints 12 may also be inclusive of a suitable interface to the human user, such as a microphone, a display, or a keyboard or other terminal equipment. Endpoints 12 may also be any device that seeks to initiate a communication on behalf of another entity or element, such as a program, a database, or any other component, device, element, or object capable of initiating a voice or a data exchange within communication system 10. Data, as used herein in this document, refers to any type of numeric, voice, or script data, or any type of source or object code, or any other suitable information in any appropriate format that may be communicated from one point to another.

Any device capable of operating as an endpoint 12 may connect to communications network 14 via wire, wireless, cellular, satellite link or other suitable interfaces. Web server 16, which includes memory 18 and processor 20, hosts central website 22 and has access to transmit and receive user or presence data (e.g., user profile data, user and/or user endpoint data, user contact data) from database 24. Presence data may be collected, aggregated, and utilized as required to facilitate communications between endpoints 12 over communications network 10 or other outside communication systems. Presence data may also include information and/or instructions enabling the creation, duration, and termination of communication sessions between diverse endpoints 12 that utilize different communication and/or networking protocols.

Central website 22 can be configured to interface with endpoints 12 and database 24, and may display data inputs from users via endpoints 12 and/or database 24. Note that central website 22 and web server 16

In one example, software that resides in web server 16 (which may be included within central website 22 is executed by processor 20 (potentially in conjunction with memory 18) to achieve the communication coordination, while protecting end user anonymity as outlined herein. Such activity could also be developed externally and then uploaded to web server 16 (i.e., central website 22).

With regard to the possible items that effectuate the teachings of the present invention, central website 22 and/or web server 16 may include software and/or algorithms to achieve the operations for processing, communicating, delivering, gathering, uploading, maintaining, and/or generally managing data, as described herein. This includes suitably displaying some [or all] of these items. Alternatively, such operations and techniques may be achieved by any suitable hardware, component, device, application specific integrated circuit (ASIC), additional software, field programmable gate array (FPGA), server, processor, algorithm, erasable programmable ROM (EPROM), electrically erasable programmable ROM (EEPROM), or any other suitable object that is operable to facilitate such operations.

Considerable flexibility is provided by the structure of central website 22 and web server 16 in the context of system 10. Thus, it can be easily appreciated that such functions could be provided external to central website 22 and web server 16 (e.g., as a solitary and/or proprietary component). In such cases, such a functionality could be readily embodied in a separate component, server, processor, device, or module. Note that these data coordination features and capabilities may be provided in just one of these elements, in both, or distributed across both of them.

For purposes of teaching and discussion, it is useful to provide some overview as to the way in which the invention disclosed herein operates in a SIP environment. The following information may be viewed as a basis from which the present invention may be properly explained. Such discussion is for purposes of explanation only and, accordingly, should not be construed in any way to limit the broad scope of the invention disclosed herein and its potential applications. Though the current invention is illustrated in the SIP environment, it is not limited to SIP and can actually apply to other VoIP protocols, as well as multiplexing implementations, etc.

Many applications require the creation and management of a session, where a session is considered an exchange of data between an association of participants. The implementation of these applications is complicated by the practices of participants: users move between endpoints, they may be addressable by multiple names, and they may communicate in several different media (in many cases simultaneously). Certain protocols, such as SIP, VoIP, RTMP and H.323, have been developed to carry various forms of real-time multimedia session data such as voice, video, and text messages.

Reliable, flexible, multimedia and voice traffic over internet protocol (IP) networks have been enabled by the SIP topology. SIP is an application layer, control protocol used to establish, modify, and terminate multimedia sessions or calls. SIP provides proxy-able messages used to perform call setup, modification, and termination functions. For example, one SIP message used to perform call setup functions is the INVITE message. The INVITE message is used to invite telephony devices to participate in media stream communications, such as voice communication, data communication, video communication, or any combination thereof. The INVITE message includes a session description protocol (SDP) portion that is used by end user devices to exchange media capabilities and other information. As unified networks emerge, it is becoming increasingly important to provide communication services seamlessly across SIP based packet networks to provide anonymized communication within these unified networks.

In some social networks, end users desire that a user's identity, address, telephone number or other personal information remain anonymous so that other users on the network may not physically, electronically, or otherwise locate a user or utilize a user's contact information for a nefarious purpose. Thus, the ability to initiate a communication session (e.g. text messaging sessions, multimedia sessions, voice call sessions, etc.) between two users, without the exchange of personal contact information in the context of a social networking network is critical from various standpoints, including personal safety and identity theft/fraud prevention.

The SIP features of communications system 10 work in concert with these protocols by enabling endpoints 12 (which may also be referred to as "user agents") to discover one another and to agree on a characterization of a session they would like to share. For locating prospective session participants, and for other functions, SIP enables the creation of an infrastructure of network hosts (which may also be referred to as "proxy servers") to which user agents can send registrations, invitations to sessions, and other requests. SIP is an agile, general-purpose tool for creating, modifying, and terminating sessions. SIP works independently of underlying transport protocols and without dependency on the type of session that is being established.

SIP is an application-layer control protocol that can establish, modify, and terminate multimedia sessions (conferences) such as Internet telephony calls. SIP can also invite participants to already existing sessions such as multicast conferences. Media can be added to (and removed from) an existing session. SIP transparently supports name mapping and redirection services, which supports personal mobility. End users can maintain a single externally visible identifier regardless of their network location.

SIP supports five facets of establishing and terminating multimedia communications: 1) user location: determination of the end system to be used for communication; 2) user availability: determination of the willingness of the called party to engage in communications; 3) user capabilities: determination of the media and media parameters to be used; 4) session setup: "ringing" establishment of session parameters at both the called and calling party locations; and 5) session management: including transfer and termination of sessions, modifying session parameters, and invoking services.

A standard SIP platform does not necessarily provide services. Rather, SIP provides primitives that can be used to implement different services. For example, SIP can locate a user and deliver opaque objects to his current location. If this primitive is used to deliver a session description written in SDP, for instance, the endpoints can agree on the parameters of a session. If the same primitive is used to deliver a photo of the caller as well as the session description, a "caller id" service can be easily implemented.

FIG. 2 depicts the components of a communications network 30 for providing anonymity for communication sessions between users. The network utilizes a source SIP server 32, a communication broker 34, a database 36, a destination SIP server 38, a source SIP endpoint 40, and a destination SIP endpoint 42. In one embodiment of the invention disclosed herein, a first user desires to initiate a voice call with a second user in a social networking environment. For example, the first user (e.g., Sally) desires to have a phone conversation with a second user (e.g., Joe) whose personal profile she has reviewed on a social networking site, such as Match.com. Joe's personal contact information, which may include his internet protocol (IP) address (e.g., Joe@gizmo.com), is not displayed publicly on the site, but a "profile name" is used [e.g., ProfileA@match.com]). Likewise, Sally's personal contact information, which may include her IP address (sally@gtalk.com), is not displayed publicly on the site and her profile name is used (e.g., ProfileZ@match.com). To initiate the contact process, the first user Sally utilizes a cell phone, Smartphone, personal computer or any other device capable of acting as SIP endpoint 40 to initiate a communication session with a second user Joe, who utilizes a cell phone, Smartphone, personal computer, or other device capable of acting as a SIP endpoint. Source SIP endpoint 40 sends a service availability request to source SIP server 32. SIP server 32 responds by initiating a session invitation to communications broker 34. Communications broker 34 accesses database 36 and receives personal contact information for both the first and second users. Database 36 and/or communications broker 34 can provide the destination contact information for the call set-up process performed by communications broker 34.

FIGS. 3A and 3B describe the call set-up process resulting in the removal of personal contact information exchanged between a first and a second user, thereby resulting in the anonymous exchange of communications between users. FIG. 3A depicts a packet 50 of electronic information, which is received by communications broker 34 from source SIP server 32, as shown in FIG. 2. Packet 50 contains address information from a first user (Sally) with a personal contact address (sally@gtalk.com) requesting a call set-up with Joe, who has profile contact address (profileA@match.com). As discussed above and with reference to FIG. 2, communications broker 34 accesses database 36 and retrieves information for translating (i.e. "mapping"), and thereby rendering anonymous, the profile name(s), profile contact address, and personal contact information of each user. Communication broker 34 prepares packet 52, as shown in FIG. 3B, with information showing the destination personal contact address of the second user (e.g., joe@gizmo.com) from a first user profile address (profilenameZ@match.com), in this example Sally's profile contact address. By translating the personal contact information and profile names of the first and second users, communications broker 34 effectively prevents both the first and second users from transmitting or receiving any personal contact information during call initiation, call session, and call teardown aspects of a SIP session.

Referring back to FIG. 2, communications broker 34 transmits a call invitation message addressed to a second user (joe@gizmo.com) from a first user (profileZ@match.com) to destination SIP server 38. Destination SIP server 38 sends a service availability request to destination SIP endpoint 42 (e.g., Joe's cell phone, Smartphone, personal computer) which if available and accepted by Joe, initiates a call set-up invitation back to Sally at SIP endpoint 40 via communications broker 34. A communications session is then initiated directly between the users (e.g., Sally and Joe exchanging data at link 44) via their respective endpoints 40, 42, without the exchange of personal contact information and thereby providing the first and second user with anonymity during the communication session.

Figure 4:
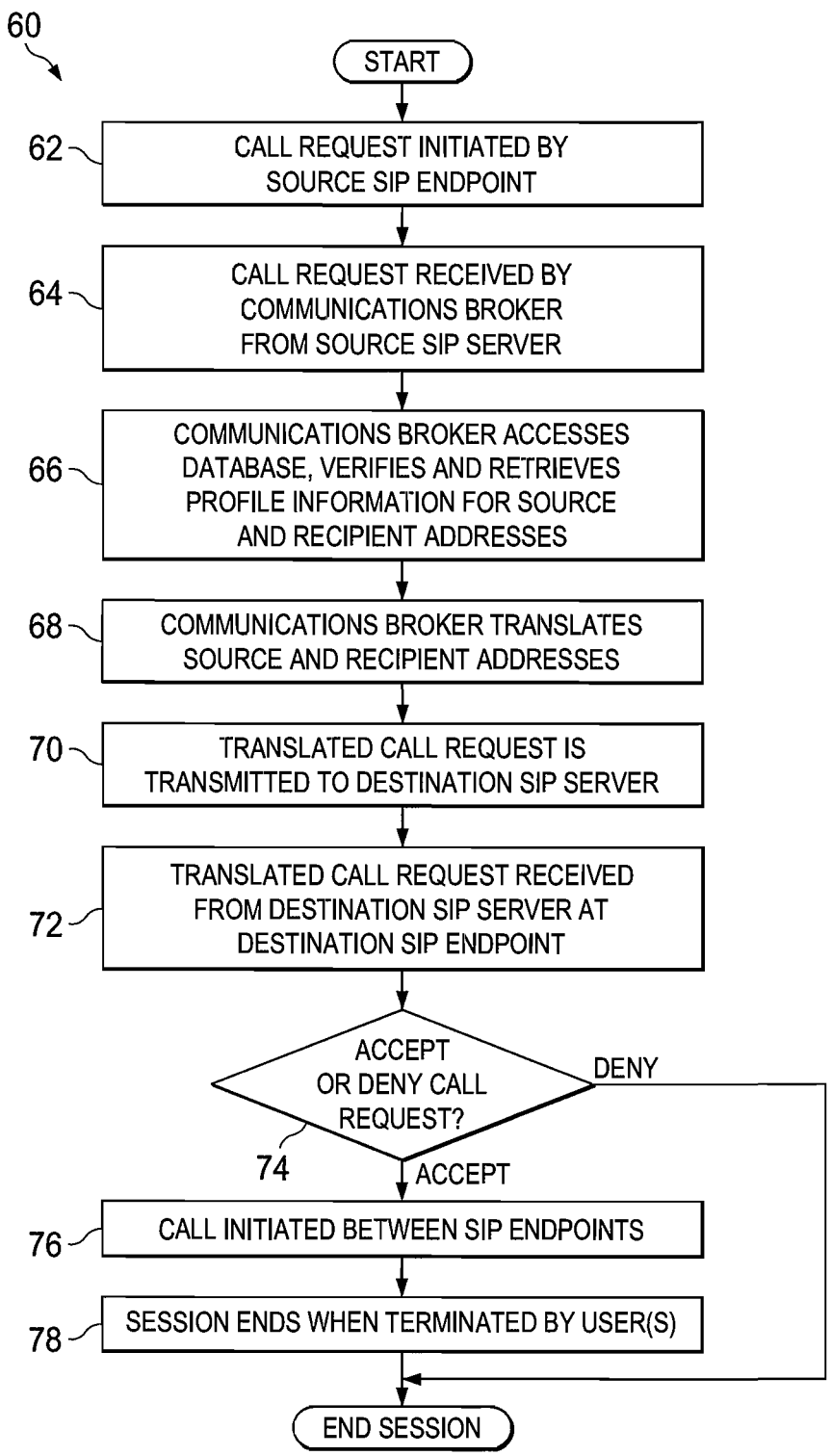
FIG. 4 is a flow diagram showing the method of one embodiment of the invention disclosed herein.

FIG. 4 is a flow diagram illustrating a method 60 embodiment of the invention disclosed herein. As previously described, a first user or source initiates a telephone call request from a SIP endpoint that is addressed to a second user or recipient (step 62) with a profile address. The call request is transmitted by a source SIP server and received by a communications broker (step 64). The communications broker accesses a database that verifies and retrieves the personal contact information and profile information for the first and second users associated with the source and recipient address information in the call request (step 66). This step may also include verification of membership status in a social networking context and other desired information that is stored on the database. The communications broker translates or "maps" the source and recipient addresses from the information retrieved from the database (step 68).

The communications broker transmits the translated call request to the recipient originating from the source profile address (step 70), with the translated call request being received by the recipient SIP endpoint from the recipient SIP server (step 72). The call recipient must then decide whether to accept or deny the call request (step 74). If the recipient accepts the call request, a communication session (e.g., telephone call, text messaging session, etc.) is initiated between the SIP endpoints (step 76). The session can remain active until terminated by the user(s) (step 78). However, if the recipient denies the request for a communication session from the source, the session is terminated.

It is important to note that the stages and steps in FIGS. 2 through 4 illustrate only some of the possible scenarios that may be executed by, or within, the present system. Some of these stages and/or steps may be deleted or removed where appropriate, or these stages and/or steps may be modified, enhanced, or changed considerably without departing from the scope of the present invention. In addition, a number of these operations have been described as being executed concurrently with, or in parallel to, one or more additional operations. However, the timing of these operations may be altered. The preceding example flows have been offered for purposes of teaching and discussion. Substantial flexibility is provided by the tendered architecture in that any suitable arrangements, chronologies, configurations, and timing mechanisms may be provided without departing from the broad scope of the invention. Accordingly, communications capabilities, data processing features and elements, suitable infrastructure, and any other appropriate software, hardware, or data storage objects may be included within the communication system and network disclosed herein to effectuate the tasks and operations of the elements and activities associated with executing a system and method for providing anonymity in a SIP network environment.

Although the present invention has been described in detail with reference to particular embodiments, it should be understood that various other changes, substitutions, and alterations may be made hereto without departing from the spirit and scope of the present invention. The illustrated network architecture of FIG. 1 has only been offered for purposes of example and teaching. Suitable alternatives and substitutions are envisioned and contemplated by the present invention, with such alternatives and substitutions being clearly within the broad scope of communication system 10. For example, use of a local area network (LAN) for the outlined communications could be easily replaced by a virtual private network (VPN), a metropolitan area network (MAN), a wide area network (WAN), a wireless local area network (WLAN), or any other element that facilitates data propagation for SIP endpoints or telephone branch offices. In addition, while the foregoing discussion has focused on SIP, any other suitable session protocol may benefit from the teachings provided herein. The present invention is not to be construed as being confined to the SIP platform or its proscriptions.

Also, some of the steps illustrated in the preceding FIGURES may be changed or deleted where appropriate and additional steps may also be added to the process flows. These changes may be based on specific communication architectures or particular interfacing arrangements and configurations of associated elements and do not depart from the scope or the teachings of the present invention. It is important to recognize that the FIGURES illustrate just one of a myriad of potential implementations of system 10.

Numerous other changes, substitutions, variations, alterations, and modifications may be ascertained to one skilled in the art and it is intended that the present invention encompass all such changes, substitutions, variations, alterations, and modifications as falling within the spirit and scope of the appended claims.

What is claimed is:

1. A method, comprising:
   receiving, from a remote first endpoint, a request for a telephonic communication session with an endpoint associated with a second user profile identifier of a second user account in a social network comprising a plurality of registered members, wherein the request is launched through the social network and identifies first personal contact information associated with the first endpoint and the second user profile identifier;
   accessing one or more databases in order to identify first user profile data mapped to the first personal contact information, the first user profile data including a first user profile identifier of a first user account in the social network;
   identifying, from the one or more databases, second personal contact information mapped to the identified second user profile identifier, the second personal contact information associated with a second endpoint;
   verifying, from the one or more databases, a membership status within the social network of an end user associated with the first endpoint; and
   facilitating initiation of the telephonic communication session, wherein facilitating initiation of the telephonic communication session includes transmitting an invitation message addressed to the second personal contact information to the second endpoint, the invitation message identifying the first user profile identifier as the sender of the invitation message, and the first user profile identifier is presented on the second endpoint and the first personal contact information is hidden from the second endpoint, wherein mapping of the first user profile identifier to the first personal contact information and mapping of the second user profile identifier to the second personal contact information persists after termination of the telephonic communication session, and the first personal contact information is hidden within the social network, wherein initiation of telephonic communication sessions is limited to sessions involving members of the social network.

2. The method of claim 1, wherein the second endpoint is operable to recognize that the first endpoint is seeking to contact the second endpoint to initiate the communication session.

3. The method of claim 1, wherein the request includes an internet protocol address associated with the first endpoint.

4. The method of claim 1, wherein the first endpoint is a selected one of a group of endpoints, the group consisting of:
   a) a personal computer;
   b) a laptop computer;
   c) a personal digital assistant;
   d) an Internet Protocol (IP) telephone;
   e) a standard telephone;
   f) an I-Phone; and
   g) a mobile phone.

5. The method of claim 1, further comprising:
   prompting the second endpoint to respond to the request in order to initiate the communication session.

6. The method of claim 1, wherein the communication session does not occur if the second endpoint declines the request.

7. The method of claim 1, wherein a communication broker serves as an intermediary between the first and second endpoints during the communication session.

8. The method of claim 7, wherein the communication broker is authorized to terminate the communication session.

9. The method of claim 1, wherein the request is for a video communication session.

10. The method of claim 1, wherein the first user profile identifier is a first user name that an end user of the first endpoint has selected and the second user profile identifier is a second user name that an end user of the second endpoint has selected.

11. The method of claim 1, wherein the request is for a voice communication session.

12. The method of claim 1, wherein the first endpoint is shown the second user profile identifier associated with the second endpoint and not the second personal contact information associated with the second endpoint.

13. The method of claim 1, wherein the request is initiated through a user interface of the social network.

14. The method of claim 1, wherein the social network comprises an online dating website and a personal profile of each of the plurality of members is viewable from the online dating website.

15. The method of claim 1, wherein the first endpoint comprises a smartphone.

16. The method of claim 1, wherein the request is sent to a first Session Initiation Protocol (SIP) server associated with the first personal contact information and initiation of the telephonic communication session includes identifying a different, second SIP server as associated with the second personal contact information, wherein the invitation message is communicated to the second SIP server and the second SIP server sends a service availability request to the second endpoint in response to the invitation message.

17. An apparatus, comprising:
   a communications broker that includes a processor and a memory, the communications broker being configured for:
      receiving, from a first endpoint, a request for a telephonic communication session with an endpoint associated with a second user profile identifier of a second user account in a social network comprising a plurality of registered members, wherein the request is launched through a website hosting the social network and identifies first personal contact information associated with the first endpoint and the second user profile identifier;
      identifying, from a database, a first user profile identifier of a first user account in the social network mapped to the first personal contact information;
      identifying, from the database, second personal contact information mapped to the second user profile identifier, the second personal contact information associated with a second endpoint;
      verifying, from the database, a membership status within the social network of an end user associated with the first endpoint; and
      facilitating initiation of the telephonic communication session, wherein facilitating initiation of the telephonic communication session includes transmitting an invitation message addressed to the second personal contact information to the second endpoint, the invitation message identifying the first user profile identifier as the sender of the invitation message, and the first user profile identifier is presented on the second endpoint and the first personal contact information is hidden from the second endpoint, wherein mapping of the first user profile identifier to the first personal contact information and mapping of the second user profile identifier to the second personal contact information persists after termination of the telephonic communication session, and the first personal contact information is hidden within the social network, wherein initiation of telephonic communication sessions is limited to sessions involving members of the social network.

18. The apparatus of claim 17, wherein the second endpoint is prompted to respond to the request in order to initiate the communication session.

19. The apparatus of claim 17, wherein the communication session does not occur if the second endpoint declines the request.

20. The apparatus of claim 17, wherein the communication broker serves as an intermediary between the first and second endpoints during the set up of the communication session.

21. The apparatus of claim 17, wherein the communication broker is authorized to terminate the communication session.

22. The apparatus of claim 17, further comprising:
   the database, wherein the database is operable to store personal contact information and associated profile identifiers within the particular context for each of a plurality of endpoints.

23. The apparatus of claim 17, wherein the first endpoint is shown the second user profile identifier associated with the second endpoint and not the second personal contact information associated with the second endpoint.

24. Logic encoded in non-transitory media that includes code for execution and when executed by a processor is operable to perform operations comprising:

receiving, from a remote first endpoint, a request for a telephonic communication session with an endpoint associated with a second user profile identifier of a second user account in a social network comprising a plurality of registered members, wherein the request is launched through the social network and identifies first personal contact information associated with the first endpoint and the second user profile identifier;

accessing a database in order to identify first user profile data mapped to the first personal contact information, the first user profile data including a first user profile identifier of a first user account in the social network;

identifying, from the database, second personal contact information mapped to the identified second user profile identifier, the second personal contact information associated with a second endpoint;

verifying, from the database, a membership status within the social network of an end user associated with the first endpoint; and facilitating initiation of the telephonic communication session, wherein facilitating initiation of the telephonic communication session includes transmitting an invitation message addressed to the second personal contact information to the second endpoint, the invitation message identifying the first user profile identifier as the sender of the invitation message, and the first user profile identifier is presented on the second endpoint and the first personal contact information is hidden from the second endpoint, wherein mapping of the first user profile identifier to the first personal contact information and mapping of the second user profile identifier to the second personal contact information persists after termination of the telephonic communication session, and the first personal contact information is hidden within the social network, wherein initiation of telephonic communication sessions is limited to sessions involving members of the social network.

25. The logic of claim 24, the operations further comprising:

prompting the second endpoint to respond to the request in order to initiate the communication session.

26. The logic of claim 24, wherein the communication session does not occur if the second endpoint declines the request.

27. The logic of claim 24, wherein an intermediary computing device is provisioned between the first and second endpoints during the communication session.

* * * * *